United States Patent [19]

Ariyoshi et al.

[11] 3,988,503
[45] Oct. 26, 1976

[54] TREATING AGENT USEFUL FOR FIBROUS MATERIALS AND PREPARATION THEREOF

[75] Inventors: Junji Ariyoshi, Hirakata; Akira Ohnishi, Ashiya; Hiromi Toda, Daito; Kametaro Kunimori, Neyagawa; Mitsuyoshi Nakao, Kawachinagano, all of Japan

[73] Assignee: Arakawa Rinsan Kagaku Kogyo Kabushiki Kaisha, Osaka, Japan

[22] Filed: Mar. 3, 1975

[21] Appl. No.: 555,039

[30] Foreign Application Priority Data
Mar. 5, 1974 Japan.............................. 49-25991

[52] U.S. Cl................................. 526/23; 8/115.5; 162/168 NA; 526/46; 526/303
[51] Int. Cl.²........................ C08F 8/08; C08J 5/18; D06M 15/12; D21H 3/38
[58] Field of Search......... 260/80.3 N, 80.73, 89.75; 8/115.5; 162/168 NA; 526/23, 46, 303

[56] References Cited
UNITED STATES PATENTS
3,507,847  4/1970  Williams et al................... 260/89.7
FOREIGN PATENTS OR APPLICATIONS
18,401  1966  Japan
14,165  1968  Japan

*Primary Examiner*—John Kight, III
*Attorney, Agent, or Firm*—Armstrong, Nikaido & Wegner

[57] ABSTRACT

Amide-containing polymer is reacted with polyalkyleneimine in an aqueous medium to form a water-soluble cationic resin which is a treating agent useful for fibrous materials. The adduct of halohydrin to the water-soluble cationic resin is a water-soluble cationic thermosetting resin and is also useful for treating fibrous materials. The treating agent has excellent retention ability to fiber, drainage property and storage stability and remarkably improves the retention of fillers and wet and dry strength of paper.

19 Claims, 2 Drawing Figures

TREATING AGENT USEFUL FOR FIBROUS MATERIALS AND PREPARATION THEREOF

BACKGROUND OF THE INVENTION

The present invention relates to a novel treating agent for paper and fiber and a process for preparing the same, and more particularly to a treating agent mainly composed of a water-soluble cationic resin available for various fibers such as vegetable fibers, mineral fibers or synthetic fibers, and products therefrom such as papers, non-woven fabrics and fiberboards. Especially, the treating agent of the invention is suitably employing in paper making.

Hitherto, anionic acrylamide polymers have been widely employed as a treating agent in paper making. However, such polymers require a retention aid such as aluminum sulfate and the use thereof is limited to acidic pH range. Therefore, they have defects such as waste water problem, corrosion of paper machine and deterioration of paper.

There have also been proposed various cationic treating agents not requiring a retention aid such as aluminum sulfate.

U.S. Pat. No. 2,926,116 discloses a polyamide-polyamine resin. Such a resin improves dry and wet strengths of paper. However, the foaming tends to occur in sheet forming, and also the drainage and the retention effect for fillers are inferior.

It is known that polyethyleneimine, which is highly cationic, is employed as a wet strength agent, and the application thereof to paper making or the derivative thereof has been reported. Japanese Pat. Publication No. 18401/1966 discloses polyethyleneimine-partially hydrolyzed polyacrylamide complex indicating amphoteric polyelectrolyte, which is prepared by adding an aqueous solution of polyethyleneimine to an aqueous solution of partially hydrolyzed polyacrylamide and employed in a form of aqueous solution as a wet and dry strength agent. However, the improvement of wet and dry strengths of paper, the drainage and the retention effect for fillers are not necessarily sufficient. Also, polyethyleneimine-epichlorohydrin strength agent as shown in Japanese Pat. Publication No. 14165/1968 improves wet strength, but has disadvantages that the drainage in sheet forming and the retention effect for fillers are poor and the formed sheet is noticeably colored.

Further, there has been known from U.S. Pat. No. 3,507,847 a water-soluble cationic vinyl polymer useful as a wet strength agent in paper making, which is prepared by reacting polyacrylamide with di- or polyamines having at most six amino groups so as to introduce cationic groups to polyacrylamide by deammonification condensation. This cationic polymer can improve wet strength of paper, but the use thereof is limited to a narrow pH range around neutrality and also it is not practical in point of dry strength, retention effect for fillers and drainage. The above U.S. Patent also discloses a strength agent obtained by further subjecting the polyacrylamide-di- or poly-amine reaction product to addition reaction with epichlorohydrin. Epichlorohydrin has the effect of further improving wet strengthening property of the polyacrylamide-di- or poly-amine reaction product to some extent and also has the effect of extending the pH range from neutrality to an alkaline range. However, such a strength agent still possesses the above-mentioned disadvantages and is not a satisfactory strength agent.

OBJECTS OF THE INVENTION

It is an object of the present invention to provide a novel treating agent useful for fibrous materials, which is mainly composed of a water-soluble cationic resin.

A further object of the invention is to provide a treating agent useful for fibrous materials, which is mainly composed of a water-soluble cationic thermosetting resin.

A still further object of the invention is to provide processes for preparing the above-mentioned treating agents giving improved wet and dry strengths as well as other desirable properties.

Another object of the invention is to provide applications of the treating agents.

These and other objects of the invention will become apparent from the description hereinafter.

DETAILED DESCRIPTION

It has now been found that the above-mentioned objects can be accomplished by the discovery that a water-soluble cationic resin obtained by subjecting an amide-containing polymer, which consists essentially of 60 to 100% by mole of a component having the following structure:

wherein $R^1$ is hydrogen or methyl group and 0 to 40% by mole of a component having the following structure:

wherein $R^2$ is hydrogen or methyl group and X is a member selected from the group consisting of $-COOR^3$, $-CN$, and $-CONHR^7$ and wherein $R^3$ is an alkyl group having 1 to 8 carbon atoms, glycidyl group or a hydroxyalkyl group having 2 to 4 carbon atoms, $R^4$, $R^5$ and $R^6$ are independently hydrogen, methyl group or ethyl group and $R^7$ is a hydroxyalkyl group having 1 to 2 carbon atoms or (CH₃)₂CCH₂COCH₃.

to deammonification condensation with polyalkyleneimine, or a water-soluble cationic thermosetting resin obtained by reacting the amide-containing polymer, the polyalkyleneimine and a halohydrin, has the excellent effects on treating paper and fiber.

According to the present invention, such water-soluble cationic resins can be effectively employed as a treating agent for fibrous materials such as paper and fiber and also the obtained aqueous solution of reaction product can be effectively employed as the treating agent for paper and fiber by itself. The treating agent of the invention has the following advantageous properties.

The treating agent of the invention is excellent in a retention ability to fiber and thus does not require a retention aid such as aluminum sulfate, and also is usable in a wide pH range, for instance, in the range of pH 3 to 10.

In paper making process, the treating agent of the invention has excellent drainage property in sheet forming and remarkably improves the retention of basic fillers such as calcium carbonate, not to mention usual fillers such as clay, talc, kaolin and titanium oxide. Further, the treating agent of the invention improves sizing degree of formed paper, wet and dry strengths of formed paper and ply-adhesion of paperboard. The treating agent of the invention is very stable for a long period of time in a form of solid or aqueous solution and does not show any quality change, and thus superior in storage stability. In addition, the treating agent does not show any trouble in sheet forming such as foaming or contamination on blanket and wire.

The water-soluble cationic resin of the invention is generally prepared by reacting an amide-containing polymer such as polyacrylamide with polyalkyleneimine in an aqueous medium at pH 6 to 10, preferably at pH 7 to 9, at a temperature of 20° to 100° C., preferably 60° to 90° C., for 30 minutes to 10 hours to give a condensate. The higher the pH and also the higher the temperature, the more smoothly the above reaction proceeds. Therefore, the aqueous solution of condensate stable in acidic pH range can be obtained by cooling the reaction mixture and making it acidic at a point of time when the degree of condensation reaches a desired degree, for instance, at a point of time when the viscosity (measured by Brookfield viscometer) of the reaction mixture in a concentration of 10% by weight increases to 1.5 to 10 times the original. In general, the molar ratio of amide group in the amide-containing polymer to amino group in polyalkyleneimine falls within the range of 95 : 5 to 10 : 90, preferably 90 : 10 to 20 : 80. However, it is more preferable to employ the amide-containing polymer and the polyalkyleneimine in a molar ratio of amide group to amino group of from 90 : 10 to 50 : 50 because polyalkyleneimine is expensive and the treating agent obtained by employing large quantities of polyalkyleneimine has a tendency of coloring a paper. When the ratio of the polyalkyleneimine is less than the above-mentioned range, the cationic property of the obtained condensate becomes poor and, therefore, the retention ability is insufficient. When the ratio of the polyalkyleneimine is more than the above-mentioned range, the excellent effects that the amide-containing polymer possesses in itself are lost. Also, the retention effect for fillers and wet and dry strengthening properties lower out of the above-mentioned range.

In the present invention, as the amide-containing polymer, those having a molecular weight measured by means of an intrinsic viscosity method of 10,000 to 2,000,000, preferably 100,000 to 1,000,000 are suitably employed. When the molecular weight is more than 2,000,000, the texture and wet and dry strengths of formed paper become poor though the drainage property and retention effect for fillers are improved. On the other hand, when the molecular weight is less than 10,000, the wet and dry strengthening properties, drainage property and retention effect for fillers are insufficient.

Examples of the amide-containing polymers employed in the present invention are homopolymers of acrylamide or methacrylamide, copolymer of acrylamide and methacrylamide, copolymers of acrylamide and/or methacrylamide and not more than 40% by mole of vinyl monomer polymerizable therewith. As the vinyl monomer, nonionic vinyl monomers are preferably employed. Examples of the nonionic vinyl monomer are those having the general formula of wherein $R^2$ is hydrogen or methyl group and $R^3$ is an alkyl group having 1 to 8 carbon atoms, glycidyl group or a hydroxyalkyl group having 2 to 4 carbon atoms, such as methyl acrylate, ethyl acrylate, butyl acrylate, methyl methacrylate, 2-ethylhexyl methacrylate, glycidyl methacrylate or hydroxyethyl methacrylate, those having the general formula:

wherein $R^2$ is as defined above, such as acrylonitrile or methacrylonitrile, those having the general formula:

wherein $R^2$ is as defined above and $R^4$ and $R^5$ are hydrogen, methyl group or ethyl group, such as styrene, vinyltoluene, vinylxylene or α-methylstyrene, those having the general formula:

wherein $R^2$ is as defined above and $R^6$ is hydrogen, methyl group or ethyl group, such as vinyl acetate or vinyl propionate, and those having the general formula:

wherein $R^2$ is as defined above and $R^7$ is a hydroxyalkyl group having 1 to 2 carbon atoms or such as N-methylolacrylamide or diacetoneacrylamide. The polymerization ratio of these nonionic vinyl monomers is preferable within the range that the flocculating and water-soluble properties of the amide-containing copolymer are not inhibited. Further, as the amide-containing polymer, there may also be employed in the present invention those further including an anionic vinyl monomer such as acrylic acid and methacrylic acid, which is copolymerized within the range that the obtained condensate of the amide-containing polymer and polyalkyleneimine is substantially cationic, usually at a molar ratio of not more than 10%, preferably not more than 5% in the polymer.

As the polyalkyleneimine, both of straight chain and branched chain polymers are employed, and those having a degree of polymerization of not less than 20, preferably not less than 100 are suitably employed. Examples of the polyalkyleneimine employed in the present invention are polyethyleneimine and polypropyleneimine. When the degree of polymerization is less than 20, the flocculating property of the obtained condensate becomes poor, and in addition to the inferiority in the drainage property and retention effect for fillers, the wet and dry strengthening properties lower. Also, even if the polyalkyleneimine having a degree of polymerization of more than 5,000 is employed, no advantage which results from that the degree of polymerization is especially high is obtained and, therefore, the polyalkyleneimine having a degree of polymerization of 100 to 5,000 is usually employed.

In the deammonification condensation, it suffices to give the water-soluble cationic resin effective as the treating agent that at least one amide group in the amide-containing polymer combines to at least one amino group in the polyalkyleneimine, and this condensation often occurs among many polymer chains with each other. As a result of the deammonification condensation between the amide group in the amide-containing polymer and the amino group in the polyalkyleneimine, the polyalkyleneimine grafts onto the amide-containing polymer through amide bonding and the cationic condensate is obtained. Even if the non-reacted polyalkyleneimine remains in the so obtained aqueous solution of water-soluble cationic resin, the polyalkyleneimine per se is effective as a strength agent and the present invention is not inhibited thereby.

In the course of the condensation reaction, when the reaction mixture, for instance, the reaction mixture of polyacrylamide and polyethyleneimine is added to methanol, it separates to a material soluble in methanol and a material insoluble in methanol. On further proceeding the reaction, when the reaction mixture is added to methanol, a material soluble in methanol decreases. With the passage of reaction time and with the increase of the viscosity of the reaction mixture, the material soluble in methanol decreases in order, and at last it is quite gone. From the fact that polyacrylamide is insoluble in methanol and polyethyleneimine is soluble in methanol and also that the infrared absorption spectrum of the material insoluble in methanol shows sharp absorption being characteristic in amino group at 2350 cm.$^{-1}$, it is clear that polyethyleneimine chemically combines to polyacrylamide.

Figure 1:
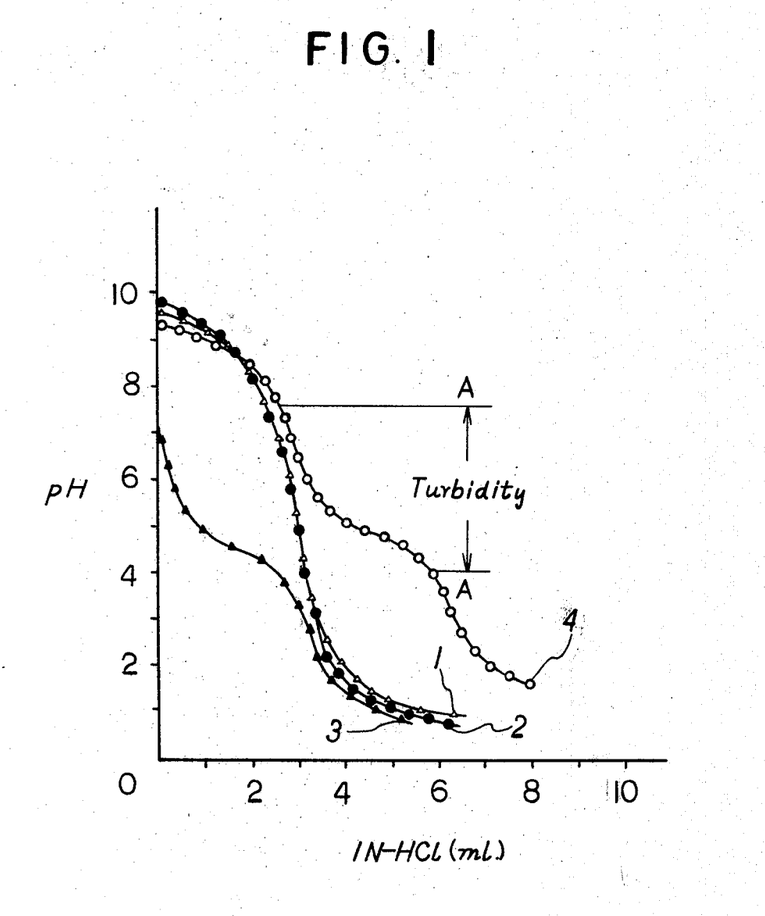
FIG. 1 is a graph showing pH titration curves of the treating agent of the present invention and conventional treating agents.

FIG. 1 is a graph showing the results of titration of an aqueous solution of polyacrylamide-polyethyleneimine condensate by 1N-HCl. As comparative data, the results of aqueous solutions of polyethyleneimine, partially hydrolyzed polyacrylamide and partially hydrolyzed polyacrylamide-polyethyleneimine complex are also shown together therewith. In this measurement, polyacrylamide having a molecular weight measured by means of an intrinsic viscosity method of 500,000 and polyethyleneimine having a degree of polymerization of 1,000 were employed. In the titration curves of FIG. 1, reference 1 shows the titration curve of 67.61 g. of 5% by weight aqueous solution of polyacrylamide-polyethyleneimine condensate obtained by reacting polyacrylamide with polyethyleneimine in a molar ratio of 94 : 6 in the present invention, reference 2 shows the titration curve of 1.25 g. of 10% by weight aqueous solution of polyethyleneimine, reference 3 shows the titration curve of 64.05 g. of 5% by weight aqueous solution of partially hydrolyzed polyacrylamide having a degree of hydrolysis of 7.4% by mole, reference 4 shows the titration curve of the complex obtained by mixing 63.73 g. of 5% by weight aqueous solution of partially hydrolyzed polyacrylamide having a degree of hydrolysis of 7.4% by mole and 2.59 g. of 5% by weight aqueous solution of polyethyleneimine, and A—A shows the pH range causing turbidity in the titration of the complex. As is clear from FIG. 1, the condensate in the invention does not show properties of amphoteric electrolyte and does not cause turbidity and precipitate in the wide pH range extending from the acidic range to the alkaline range, differing from the partially hydrolyzed polyacrylamide-polyethyleneimine complex disclosed in Japanese Patent Publication No. 18401/1966.

According to the present invention, a part or all of the amino groups in the so obtained condensate of the amide-containing polymer and the polyalkyleneimine may be alkylated to increase the stability of the condensate in an aqueous medium by a conventional means using an alkylating agent such as methyl chloride, ethylchloride, benzyl chloride, allyl chloride, methyl bromide, ethyl bromide, benzyl bromide, allyl bromide, methyl iodide, ethyl iodide, benzyl iodide, allyl iodide, dimethyl sulfate, dimethyl sulfite, dimethyl phosphate, ethylene oxide, propylene oxide, butylene oxide and styrene oxide.

The addition of the halohydrin to the condensate or the partially alkylated condensate gives the water-soluble cationic thermosetting resin, and such a water-soluble cationic thermosetting resin is also effective as the treating agent.

The thermosetting resin can be prepared by any of the following three processes.

1. Amide-containing polymer, polyalkyleneimine and halohydrin are simultaneously subjected to addition and condensation reactions in an aqueous medium in a concentration of 5 to 30% by weight, preferably 10 to 20% by weight at pH 6 to 10, preferably pH 7 to 9 at a temperature of 20° to 100° C., preferably 60° to 90° C.

2. Amide-containing polymer and polyalkyleneimine are subjected to the deammonification condensation in an aqueous medium in a concentration of 5 to 30% by weight at pH 6 to 10, preferably pH 7 to 9 at a temperature of 20° to 100° C., preferably 60° to 90° C., and then the resulting condensate and halohydrin are subjected to addition reaction in an aqueous medium in a concentration of 5 to 30% by weight at pH 4 to 10, preferably pH 6 to 8 at a temperature of 20° to 100° C., preferably 30° to 70° C.

3. Polyalkyleneimine and halohydrin are subjected to addition reaction in an aqueous medium in a concentration of 5 to 30 % by weight at pH 4 to 10, preferably pH 6 to 8 at a temperature of 20° to 100° C., preferably 30° to 70° C., and then the resulting adduct and amide-containing polymer are subjected to deammonification condensation in an aqueous medium in a concentration of 5 to 30 % by weight at pH 6 to 10, preferably pH 7 to 9 at a temperature of 20° to 100° C., preferably 60° to 90° C. The addition reaction of halohydrin to the amino groups in the polyalkyleneimine is usually carried out for 10 minutes to 5 hours. In the above processes (1) and (3), the conditions of the addition reaction are determined in consideration of the conditions of the deammonification condensation, because the condensation is carried out at the same time as the addition reaction or after the addition reaction. By the reason of easiness of controlling the reaction, the above process (1) or (2), preferably the process (2) is suitably employed.

The halohydrin adds to the amino group of polyalkyleneimine by any of the above processes, and the thermoreactive, functional group can be introduced to the end product. This thermoreactive, functional group reacts with hydroxyl group and carboxyl group of pulp and further improves wet and dry strengths of formed paper.

In general, satisfactory results are obtained by employing 0.5 to 3 moles of the halohydrin, preferably 1.0 to 2.5 moles of the halohydrin per mole of amino group present in the reaction system. When the ratio of the halohydrin to the amino group is less than the above range, the thermosetting property is insufficient. On the other hand, when the ratio is more than the above range, the reaction mixture tends to gel during the reaction or on storage of the product.

Examples of the halohydrin employed in the present invention are epichlorohydrin, epibromohydrin, monochlorohydrin, monobromohydrin, dichlorohydrin and dibromohydrin. Epichlorohydrin and epibromohydrin are preferably employed in the invention.

According to the present invention, the obtained aqueous solution of the condensate, the alkylated condensate or the thermosetting resin is adjusted to pH 4 to 6 by an acid, for instance, inorganic acids such as hydrochloric acid, sulfuric acid or phosphoric acid and organic acids such as formic acid, acetic acid or oxalic acid, to give the treating agent stable for a long period of time. The thermosetting resin is reactive and, therefore, the storage stability is inferior to some extent to the condensate. The storage stability may be improved by optionally adding to the solution a stabilizer, for instance, salts of an organic acid such as formic acid or acetic acid or an inorganic acid such as hydrochloric acid, sulfuric acid or phosphoric acid with sodium, potassium or ammonia, and salts of hydrochloric acid with magnesium, calcium, iron, chromium or aluminum.

In case of recovering the water-soluble cationic resin in a form of solid, the obtained solution is added to a lower alkyl alcohol such as methanol, ethanol, propanol, or isopropanol to precipitate the resin because the resin is insoluble in these solvents, and thereafter the precipitated resin is filtered and washed with the above alcohol. The solid resin so obtained is also very stable, readily dissolved in water and useful for use as the treating agent.

The treating agent of the present invention has excellent properties as mentioned before and can give satisfactory effects. The treating agent of the invention is especially useful in paper making.

The treating agent of the invention may also be employed in combination with another treating agents. For instance, use of the treating agent of the invention in combination of partially hydrolyzed polyacrylamide can give more excellent results.

The treating agent of the invention may be employed in combination of a retention aid such as aluminum sulfate.

The treating agent of the invention is applied by various means, for instance, incorporation to a slurry of fiber in paper making, spraying to a wet paper, coating onto surfaces of paper or dipping of paper thereto. When employed as a wet end additive in paper making, the treating agent of the invention is usually added to a slurry of fiber in an amount of 0.05 to 10 % by weight to the fiber at pH 3 to 10. In general, the concentration of the slurry is within the range of 0.3 to 4 % by weight. In case the fiber is pulp, the treating agent is preferably added in an amount of 0.05 to 3 % by weight to the fiber, and in case the fiber is rock wool, the treating agent is added in an amount of 0.5 to 10 % by weight to the fiber. In paper making, if desired, a filler may also be added to the slurry in an amount of 5 to 30 % by weight to the fiber. In case the fiber is pulp, the filler such as clay, talc, kaolin, calcium carbonate, titanium oxide or asbestos is usually employed. The use of the treating agent of the invention in paper making can improve the retention of fillers.

In addition to the use for paper making, the treating agent of the invention is applicable as a dry and wet strength agent or an adhesive aid for various fibers, for instance, vegetable fibers such as wood pulp, bagasse pulp, bamboo pulp or straw pulp, mineral fibers such as rock wool, asbestos or glass wool and synthetic fibers, and for sheets, non-woven fabrics and fiberboards made from the above fibers. The treating agent is also applicable as an adhesive or a coating material for the fibers, sheets, non-woven fabrics and fiberboards as mentioned above by means of incorporation, coating, spraying or dipping.

The treating agent of the invention is also applicable as a flocculant, for instance, as a flocculant for treating a waste water including suspended matters.

The present invention is more specifically described and explained by means of the following Examples, in which all percents are percent by weight. These examples are preferred embodiments of the invention and are not to be construed as limitations thereof. The following Reference Example is one instance showing the preparation of the amide-containing polymer employed in the invention.

Reference Example

A one liter four necked flask equipped with a reflux condenser, a stirrer, a thermometer and a supply pipe for nitrogen gas was charged with 33.3 g. of acrylamide, 0.6 g. of allyl alcohol and 279 g. of deionized water. The temperature was elevated to 60° C. while supplying nitrogen gas, and then 0.33 g. of potassium persulfate dissolved in 20 g. of deionized water was added to the flask. The temperature was further elevated to 80° C., and at this temperature the polymerization was carried out for 2.5 hours. After the conclusion of the polymerization, the reaction mixture was cooled to give an aqueous solution of polyacrylamide. The concentration and viscosity at 25° C. of the solution were 10.0 % and 5,000 cP, respectively, and the molecular weight measured by means of an intrinsic viscosity method of the obtained polyacrylamide was 470,000.

EXAMPLE 1

A one liter three necked flask equipped with a reflux condenser, a stirrer and a thermometer was charged with 568 g. of 10 % aqueous solution of polyacrylamide obtained in the above Reference Example and 43 g. of 20 % aqueous solution of polyethyleneimine having a degree of polymerization of 1,000. The molar ratio of amide group to amino group was 80 : 20. After adjusting the mixture to pH 7.0 with hydrochloric acid, the temperature was elevated at 80° C., and at this temperature the reaction was carried out for 2 hours. After the conclusion of the reaction, the reaction mixture was cooled, and thereto 10.7 g. of ammonium chloride was then added. The obtained solution was adjusted to pH 5.0 with hydrochloric acid to give an aqueous solution of the water-soluble cationic resin. The content of non-volatile material and viscosity at 25° C. of the solution were 11.0 % and 8,000 cP, respectively.

EXAMPLE 2

A one liter three necked flask equipped with a reflux condenser, a stirrer and a thermometer was charged with 568 g. of 10 % aqueous solution of polyacrylamide obtained in the above Reference Example and 43 g. of 20 % aqueous solution of polyethyleneimine having a degree of polymerization of 1,000. The molar ratio of amide group to amino group was 80 : 20. After adjusting the mixture to pH 7.0 with hydrochloric acid, the temperature was elevated at 80° C., and at this temperature the reaction was carried out for 2 hours. After the conclusion of the reaction, the reaction mixture was cooled, and thereto 10.7 g. of ammonium chloride was then added.

To 262 g. of the obtained aqueous solution of polyacrylamide-polyethyleneimine condensate, 14.8 g. of epichlorohydrin was added, and the reaction was then carried out at pH 7.0 at a temperature of 50° C. for 2 hours. The molar ratio of epichlorohydrin to the amino group present in the reaction mixture was about 2 : 1. After the conclusion of the reaction, the reaction mixture was diluted with water and adjusted to pH 5.0 with hydrochloric acid to give an aqueous solution of the water-soluble cationic thermosetting resin. The content of non-volatile material and viscosity at 25° C. of the solution were 10.7 % and 800 cP, respectively.

Comparative Example 1

A one liter three necked flask equipped with a reflux condenser, a stirrer and a thermometer was charged with 568 g. of 10 % aqueous solution of polyacrylamide having a molecular weight of 470,000 and 60 g. of 20 % aqueous solution of ethylenediamine. The molar ratio of amide group to ethylenediamine was 80 : 20. The reaction was carried out at a temperature of 80° C. for 2 hours and further carried out at a temperature of 95° C. for 1 hour. After cooling to 50° C., 36.9 g. of epichlorohydrin was added to the reaction mixture and the reaction was further carried out at a temperature of 50° C. for 2 hours. The molar ratio of epichlorohydrin to ethylene diamine employed was about 2 : 1. After the conclusion of the reaction, the reaction mixture was diluted with water and adjusted to pH 5.1 to give an aqueous solution of which the content of non-volatile material and viscosity at 25° C. were 9.0 % and 4,200 cP, respectively.

Comparative Example 2

A one liter three necked flask equipped with a reflux condenser, a stirrer and a thermometer was charged with 86 g. of 20 % aqueous solution of polyethyleneimine having a degree of polymerization of 1,000, 185 g. of epichlorohydrin, 16 g. of hydrochloric acid in concentration of 35 % and 720 g. of water. The reaction was carried out at a temperature of 50° C. for 2 hours and further at a temperature of 70° C. for 2 hours. After the conclusion of the reaction, the reaction mixture was cooled, and adjusted to pH 5.2 with hydrochloric acid to give an aqueous solution of which the content of non-volatile material was 10.2 % and the viscosity at 25° C. was 150 cP.

Comparative Example 3

The same polyacrylamide and polyethyleneimine as those employed in Example 1 were admixed in the same proportion as in Example 1. After agitating the mixture at a temperature of 20° C. for 3 minutes, the mixture was immediately adjusted to pH 4 with hydrochloric acid.

Comparative Example 4

Polyacrylamide obtained in Reference Example was partially hydrolyzed.

The hydrolyzed polyacrylamide having a degree of hydrolysis of 5 % by mole and polyethyleneimine having a degree of polymerization of 1,000 were admixed in the same proportion as that of polyacrylamide and polyethyleneimine in Example 1. After agitating the mixture at a temperature of 20° C. for 3 minutes, the mixture was immediately adjusted to pH 4 with hydrochloric acid.

EXAMPLE 3

The same procedure as in Example 1 was repeated except that the molar ratio of amide group in polyacrylamide to amino group in polyethyleneimine was 50 : 50, to give an aqueous solution of the water-soluble cationic resin.

The content of non-volatile material and the viscosity at 25° C. of the solution were 10.0 % and 3,000 cP, respectively.

EXAMPLE 4

Epichlorohydrin was reacted with polyacrylamide-polyethyleneimine condensate in a ratio of 2 moles of epichlorohydrin per mole of the amino group present in the reaction system in the same manner as in Example 2 except that the aqueous solution obtained in Example 3 was employed.

An aqueous solution of the water-soluble cationic thermosetting resin was obtained, of which pH, the content of non-volatile material and the viscosity at 25° C. were 5.2, 10.3 % and 1,000 cP, respectively.

EXAMPLE 5

The same procedure as in Example 2 was repeated except that polyacrylamide having a molecular weight of 100,000 was employed instead of polyacrylamide having a molecular weight of 470,000 to give an aqueous solution of water-soluble cationic thermosetting resin, of which pH, the content of non-volatile material and the viscosity at 25° C. were 5.4, 10.5 % and 130 cP.

After the lapse of half a year, no quality change of the solution was observed.

EXAMPLE 6

The same procedure as in Example 2 was repeated except that polyacrylamide having a molecular weight of 540,000 and polyethyleneimine having a degree of polymerization of 150 were employed instead of polyacrylamide having a molecular weight of 470,000 and polyethyleneimine having a degree polymerization polymerizaton of 1,000 to give an aqueous solution of the resin, of which pH, the content of nonvolatile material and the viscosity at 25° C. were 5.5, 9.5 % and 1,000 cP, respectively.

EXAMPLE 7

To 239 g. of 15 % aqueous solution of copolymer consisting of 70 % by mole of acrylamide and 30 % by mole of acrylonitrile (of which viscosity at 25° C. was 2,400 cP), 27 g. of 20 % aqueous solution of polyethyleneimine having a degree of polymerization of 1,000 was added. The molar ratio of amide group in the copolymer to amino group in polyethyleneimine was 75 : 25. The reaction was then carried out at pH 7.2 at a temperature of 80° C. for 2 hours to give an aqueous solution of the condensate.

Then, the resulting condensate was reacted with epichlorohydrin at a temperature of 50° C. in a ratio of 2 moles of epichlorohydrin per mole of the amino group present in the reaction mixture to give an aqueous solution of water-soluble cationic thermosetting resin, of which pH, the content of non-volatile material and the viscosity at 25° C. were 6.2, 13.0 % and 600 cP, respectively.

EXAMPLE 8

To 365 g. of 10 % aqueous solution of copolymer consisting of 95 % by mole of acrylamide and 5 % by mole of methyl methacrylate (of which viscosity at 25° C. was 6,300 cP), 27 g. of 20 % aqueous solution of polyethyleneimine having a degree of polymerization of 1,000 was added, and then the reaction was carried out at pH 7.8 at a temperature of 80° C. for 2 hours to give an aqueous solution of the condensate. The content of non-volatile material and viscosity at 25° C. of the obtained solution were 11.3 % and 7,500 cP, respectively.

To the obtained solution, 23 g. of epichlorohydrin was added, and then the reaction was carried out at pH 7.0 at a temperature of 50° C. for 2 hours. After the conclusion of the reaction, the reaction mixture was diluted with water and adjusted to pH 4.0 with hydrochloric acid to give an aqueous solution of water-soluble cationic thermosetting resin of which the content of non-volatile material and viscosity at 25° C. were 11.0 % and 900 cP, respectively.

EXAMPLE 9

The same procedure as in Example 8 was repeated except that 386 g. of 10 % aqueous solution of copolymer consisting of 95 % by mole of acrylamide and 5 % by mole of styrene (of which viscosity at 25° C. was 3,500 cP) was employed instead of acrylamide-methyl methacrylate copolymer to give an aqueous solution of water-soluble cationic thermosetting resin of which pH, the content of non-volatile material and the viscosity at 25° C. were 3.8, 10.8 % and 850 cP, respectively.

EXAMPLE 10

The same procedure as in Example 8 was repeated except that 386 g. of 10 % aqueous solution of copolymer consisting of 95 % by mole of acrylamide and 5 % by mole of vinyl acetate (of which viscosity at 25° C. was 4,000 cP) was employed instead of acrylamide-methyl methacrylate copolymer to give an aqueous solution of water-soluble cationic thermosetting resin, of which pH, the content of non-volatile material and the viscosity at 25° C. were 3.7, 10.9 % and 750 cP, respectively.

EXAMPLE 11

The same procedure as in Example 8 was repeated except that 397 g. of 10 % aqueous solution of copolymer consisting of 40 % by mole of acrylamide and 60 % by mole of methacrylamide (of which viscosity at 25° C. was 4,500 cP) was employed instead of acrylamide-methyl methacrylate copolymer to give an aqueous solution of water-soluble cationic thermosetting resin, of which pH, the content of non-volatile material and the viscosity at 25° C. were 3.9, 11.2 % and 950 cP, respectively.

EXAMPLE 12

To 550.7 g. of 10 % aqueous solution of polyacrylamide (of which viscosity at 25° C. was 2,000 cP), 27.8 g. of 30 % aqueous solution of polyethyleneimine having a degree of polymerization of 1,000, 35.8 g. of epichlorohydrin, 5.3 g. of 35 % sulfuric acid and 45.7 g. of water were added, and then the reaction was carried out at pH 9.0 at a temperature of 75° to 80° C. for 3 hours. At the conclusion of the reaction, pH of the reaction mixture was 6.7. Then, 10.4 g. of ammonium chloride, 320 g. of water and 3.2 g. of 35 % hydrochloric acid were added to the obtained reaction mixture to give an aqueous solution of water-soluble cationic thermosetting resin of which pH, the content of non-volatile material and the viscosity at 25° C. were 4.2, 10.6% and 300 cP, respectively.

EXAMPLE 13

The aqueous solutions obtained in Examples 1 and 2 and Comparative Examples 1 to 4 were applied to paper making as a treating agent.

To a 1% slurry of laubholz bleached kraft pulp beaten to Schopper-Riegler of 30° was added each aqueous solution in an amount of 0.5% (calculated as a non-volatile material) to pulp, respectively. Employing a TAPPI standard sheet machine, handsheets having a basis weight of 60 g./m.$^2$ were formed at pH 7.0 at a temperature of 20° C. The formed sheets were wet-pressed at a pressure of 3 kg./cm.$^2$ and then dried at a temperature of 110°C. for 5 minutes. After conditioning for 24 hours at a temperature of 20°C. and a relative humidity of 65%, the sheets were provided to tests.

The specific bursting strength of the sheets was determined in accordance with JIS P 8112 and the breaking length of the sheets was determined in accordance with JIS P 8113 and JIS P 8115.

The same procedure as above was repeated except that clay was further added to the slurry in an amount of 30% to pulp to form sheets. Employing the so obtained sheets, the retention of filler was determined, which was calculated from the ash content.

Further, as a control, the same procedure as above was repeated except that no treating agent was employed.

The results are shown in the following Table 1.

Table 1

| Test No. | Treating agent | Physical property | | | Retention of filler % |
|---|---|---|---|---|---|
| | | Specific bursting strength | Breaking length Dry km. | Wet km. | |
| 1 | Example 1 | 2.34 | 8.72 | 0.30 | 82.4 |
| 2 | Example 2 | 2.82 | 9.34 | 0.95 | 79.6 |
| 3 | Comparative Example 1 | 2.09 | 7.92 | 0.27 | 39.0 |
| 4 | Comparative Example 2 | 2.48 | 8.61 | 1.05 | 49.5 |
| 5 | Comparative Example 3 | 1.96 | 8.02 | 0.24 | 39.0 |
| 6 | Comparative Example 4 | 1.95 | 7.64 | 0.18 | 37.1 |
| 7 | None | 1.88 | 7.47 | 0.15 | 31.8 |

As is clear from Table 1, differences between the treating agent obtained in Example 2 and the treating agent obtained in Comparative Example 1 are remarkable in each test. The treating agent of the present invention is capable of retaining fine fibers of pulp and also filler in high degree because polyethyleneimine per se possesses high flocculating property, contrary to ethylenediamine having no flocculating property which was employed in Comparative Example 1.

Figure 2:
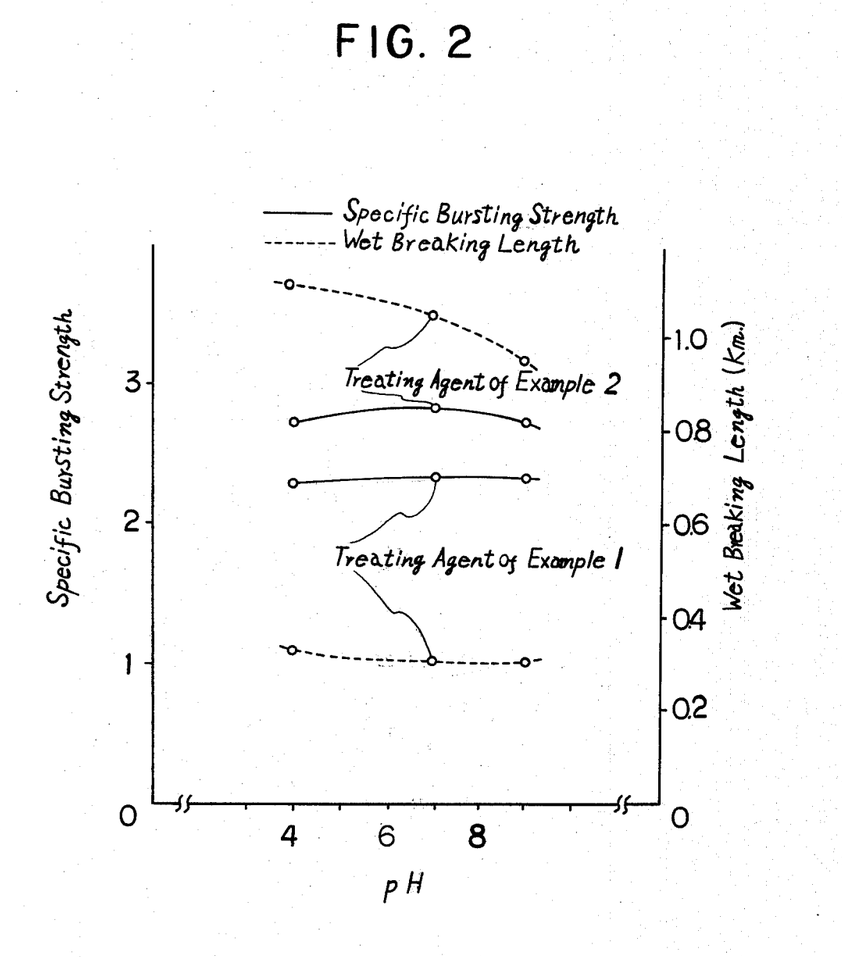
FIG. 2 is a graph showing specific bursting strength and wet breaking length of papers sheeted under conditions of pH 4, 7 and 9 in the presence of the treating agents obtained in Examples 1 and 2.

Employing the treating agents obtained in Examples 1 and 2, sheets were formed at pH 4, 7 and 9, respectively in the same manner as above, and then the specific bursting strength and the wet breaking length of the sheets were measured. The results were plotted in a graph which is shown in FIG. 2. In FIG. 2, the solid line shows the specific bursting strength and the dashed line shows the wet breaking length.

As is clear from FIG. 2, the treating agent of the present invention can be employed in a wide pH range and shows excellent improvements.

EXAMPLE 14

Employing the aqueous solutions obtained in Examples 1 to 4 and 12 as a treating agent, sheets were formed under the same conditions as in Example 13 excepting the following.

The specific bursting strength and breaking length of the sheets and the retention of filler were measured, and the results thereof are shown in Table 2.

In Table 2, method A shows a standard method carried out under the same conditions as in Example 13 (pH 7.0). In method B, after adding aluminum sulfate to the slurry in an amount of 2.5% to pulp, the treating agent was added to the slurry and sheets were formed at pH 4.5. In method C, after adding calcium carbonate to the slurry in an amount of 30% to pulp, the treating agent was added to the slurry and sheets were formed at pH 8.6. In each method, the amount of the treating agent to pulp was 0.5% (calculated as a non-volatile material).

Further, in Test No. 6 shown in Table 2, the treating agent obtained in Example 2 was employed in combination with partially hydrolyzed polyacrylamide having a degree of hydrolysis of 5% by mole. After adding hydrolyzed polyacrylamide to the slurry, the treating agent of the invention was added and sheets were formed. The amounts of hydrolyzed polyacrylamide and the treating agent of the invention were 0.25 and 0.25% (calculated as a non-volatile material) to pulp, respectively.

Also, as a control, sheets were formed by the above-mentioned methods without the treating agent. The results are also shown in Table 2.

Table 2

| Test No. | Treating agent | Method A | | | Method B | Method C | Retention of filler % |
|---|---|---|---|---|---|---|---|
| | | Specific bursting strength | Breaking Length Dry km. | Wet km. | Specific bursting strength | Specific bursting strength | |
| 1 | Example 1 | 2.36 | 5.36 | 0.35 | 2.18 | 1.60 | 69.7 |
| 2 | Example 2 | 2.72 | 6.55 | 0.87 | 2.64 | 1.83 | 69.4 |
| 3 | Example 3 | 2.41 | 6.05 | 0.43 | 2.10 | 1.62 | 72.3 |
| 4 | Example 4 | 2.68 | 6.48 | 1.31 | 2.58 | 1.91 | 71.0 |
| 5 | Example 2 plus hydrolyzed PAA* | 2.90 | 6.85 | 1.33 | 2.77 | 1.92 | 72.9 |
| 6 | Example 12 | 2.68 | 6.50 | 0.88 | 2.60 | 1.90 | 68.9 |
| 7 | None | 1.55 | 4.58 | 0.08 | 1.47 | 1.35 | 33.0 |

*Hydrolyzed PAA: hydrolyzed polyacrylamide having a degree of hydrolysis of 5 % by mole

EXAMPLE 15

Employing the aqueous solution obtained in Examples 5 to 7 as a treating agent, the same procedures as the methods A and C in Example 14 were repeated except that the treating agent was employed in an amount of 0.4% (calculated as a non-volatile material) to pulp instead of 0.5%.

The results of the measurements of specific bursting strength and breaking length of the formed sheets and retention of filler are shown in the following Table 3.

Table 3

| Test No. | Treating agent | Method A | | | Method C | |
| --- | --- | --- | --- | --- | --- | --- |
| | | Specific bursting strength | Breaking length Dry km. | Breaking length Wet km. | Specific bursting strength | Retention of filler % |
| 1 | Example 5 | 3.67 | 5.51 | 0.91 | 2.26 | 47.2 |
| 2 | Example 6 | 3.94 | 5.86 | 0.74 | 2.28 | 51.3 |
| 3 | Example 7 | 3.44 | 5.22 | 0.53 | 2.39 | 51.1 |
| 4 | None | 2.59 | 4.73 | 0.05 | 2.02 | 16.9 |

EXAMPLE 16

To a 1% slurry of laubholz bleached kraft pulp beaten to Schopper-Riegler of 31° were added 1% (calculated as a solid matter) of a sizing agent of rosin type (commercially available under the registered trademark "Size Pine E" made by Arakawa Rinsan Kagaku Kogyo Kabushiki Kaisha) and 1.5% of aluminum sulfate, respectively, to pulp. Then, handsheets having a basis weight of 60 g./m.$^2$ were formed at pH 4.5 at a temperature of 20° C. by a TAPPI standard sheet machine. The formed sheets were pressed by means of a coach press to give wet sheets having a water content of 60%.

The treating agent obtained in Example 2 was diluted with water to give the aqueous solution having a non-volatile content of 0.2%, and then sprayed onto the obtained wet sheets by means of a spray gun in an amount shown in the following Table 4. The sheets coated with the treating agent were dried at a temperature of 110° C. for 5 minutes. After conditioning for 24 hours at a temperature of 20° C. and a relative humidity of 70%, the sheets were provided for testing.

The surface strength and the Stoeckight sizing degree of the sheets were measured in accordance with JIS P 8129 and JIS P 8122, respectively.

The results of the measurements of surface strength, specific bursting strength and Stoeckight sizing degree are shown in the following Table 4.

Table 4

| Test No. | Amount of treating agent coated onto sheet g./m.$^2$ | Surface strength A | Specific bursting strength | Stoeckight sizing degree sec. |
| --- | --- | --- | --- | --- |
| 1 | 0 | 7 | 1.95 | 31.7 |
| 2 | 0.060 | 12 | 2.16 | 36.6 |
| 3 | 0.126 | 12 | 2.27 | 38.8 |
| 4 | 0.240 | 13 | 2.45 | 39.9 |

EXAMPLE 17

A one liter three necked flask equipped with a reflux condenser, a stirrer and a thermometer was charged with 497 g. of 10% aqueous solution of polyacrylamide obtained in Reference Example and 129 g. of 10% aqueous solution of polyethyleneimine having a degree of polymerization of 1,000. After adjusting to pH 7.0 with hydrochloric acid, the temperature was elevated to 80° C. and at this temperature the reaction was carried out for 2 hours to form a polyacrylamide-polyethyleneimine condensate. The molar ratio of amide group in polyacrylamide to amino group in polyethyleneimine was 70 : 30.

After the conclusion of the reaction, epichlorohydrin was added to the obtained aqueous solution of the condensate in a proportion of 2 moles of epichlorohydrin per one mole of amino group present in the reaction mixture and the addition reaction was carried out at pH 7.0 at a temperature of 50° C. for 2 hours. The resulting reaction mixture was adjusted to pH 4.9 with hydrochloric acid and an aqueous solution of water-soluble cationic thermosetting resin, of which the content of non-volatile material and the viscosity at 25° C. were respectively 10.4% and 1,400 cP, was obtained.

To a 1.3% slurry of rock wool uniformly dispersed in water were added 0.7% (calculated as a solid matter) of a sizing agent of anionic wax type (commercially available under the registered trademark Size Pine W made by Arakawa Rinsan Kagaku Kogyo Kabushiki Kaisha), 3% of hydrolyzed polyacrylamide having a molecular weight of 470,000 and a degree of hydrolysis of 5% by mole and 4% (calculated as a non-volatile material) of the above aqueous solution as a binder for a rock board, respectively, to rock wool, at a temperature of 25° C. and were admixed. Then the slurry was filtered through a wire net of 16 meshes, and the obtained cake was cold-pressed under a pressure of 2 kg./cm.$^2$ and further dried at a temperature of 150° C. for 3 hours to give a rock wool board having a thickness of 12.2 mm. and a specific gravity of 0.372. After conditioning the board for 24 hours at a temperature of 20° C. and a relative humidity of 70%, the water absorption and the bending strength of the board were determined. The water absorption was measured according to JIS A 5905 with respect to the board dipped in water for 2 hours, and the flexural strength was measured according to JIS A 5905.

The results are shown in the following Table 5.

Further, as a control, a rock wool board having a thickness of 13.0 mm. and a specific gravity of 0.363 was formed in the same manner as above except that 0.7% of the sizing agent and 15% of tapioca starch were employed instead of 0.7% of the sizing agent, 3% of the hydrolyzed polyacrylamide and 4% of the treating agent. The results are also shown in the following Table 5.

Table 5

| Binder | Water absorption g./cm.$^2$ | Bending strength kg./cm.$^2$ |
| --- | --- | --- |
| Example 17 | 0.0671 | 38.1 |
| Tapioca starch | 0.1038 | 35.1 |

What we claim is:

1. A treating agent useful for fibrous materials which comprises
   A. a reaction product of (a) an amide-containing polymer having a molecular weight measured by means of an intrinsic viscosity method of 10,000 to 2,000,000 and (b) a polyalkyleneimine having a degree of polymerization of not less than 20, or
   B. a reaction product of the above ingredients (a) and (b) and (c) a halohydrin selected from the group consisting of epichlorohydrin, epibromohydrin, monochlorohydrin, monobromohydrin, dichlorohydrin and dibromohydrin, said amide-containing polymer consisting essentially of 60 to 100% by mole of a component having the following structure:

wherein $R^1$ is hydrogen or methyl group and 0 to 40% by mole of a component having the following structure:

wherein $R^2$ is hydrogen or methyl group and X is a member selected from the group consisting of —$COOR^3$, -CN, —$OCOR^6$ and —$CONHR^7$ and wherein $R^3$ is an alkyl group having 1 to 8 carbon atoms, glycidyl group or a hydroxyalkyl group having 2 to 4 carbon atoms, $R^4$, $R^5$ and $R^6$ are independently hydrogen, methyl group or ethyl group and $R^7$ is a hydroxyalkyl group having 1 to 2 carbon atoms or 2. The treating agent of claim 1, wherein said amide-containing polymer has a molecular weight of 100,000 to 1,000,000.

3. The treating agent of claim 1, wherein said amide-containing polymer is a member selected from the group consisting of polyacrylamide, polymethacrylamide and copolymer of acrylamide and methacrylamide.

4. The treating agent of claim 1, wherein said polyalkyleneimine has a degree of polymerization of 100 to 5,000.

5. The treating agent of claim 1, wherein said polyalkyleneimine is polyethyleneimine.

6. The treating agent of claim 1, wherein molar ratio of amide group in said amide-containing polymer to amino group in said polyalkyleneimine falls within the range of 95 : 5 to 10 : 90.

7. The treating agent of claim 1, wherein molar ratio of amide group in said amide-containing polymer to amino group in said polyalkyleneimine falls within the range of 90 : 10 to 20 : 80.

8. The treating agent of claim 1, wherein molar ratio of said halohydrin to amino group in said polyalkyleneimine falls within the range of 0.5 : 1 to 3 : 1.

9. The treating agent of claim 1, wherein molar ratio of said halohydrin to amino group in said polyalkyleneimine falls within the range of 1 : 1 to 2.5 : 1.

10. A process for preparing a treating agent which comprises subjecting an amide-containing polymer having a molecular weight measured by means of an intrinsic viscosity method of 10,000 to 2,000,000 and polyalkyleneimine having a degree of polymerization of not less than 20 to deammonification condensation in an aqueous medium at pH 6 to 10 at a temperaure of 20° to 100° C. in a molar ratio of amide group in said amide-containing polymer to amino group in said polyalkyleneimine of from 95 : 5 to 10 : 90, said amide-containing polymer consisting essentially of 60 to 100% by mole of a component having the following structure:

wherein $R^1$ is hydrogen or methyl group and 0 to 40% by mole of a component having the following structure:

wherein $R^2$ is hydrogen or methyl group and X is a member selected from the group consisting of —$COOR^3$, —CN,

—$OCOR^6$ and —$CONHR^7$ and wherein $R^3$ is an alkyl group having 1 to 8 carbon atoms, glycidyl group or a hydroxyalkyl group having 2 to 4 carbon atoms, $R^4$, $R^5$ and $R^6$ independently are hydrogen, methyl group or ethyl group and $R^7$ is a hydroxyalkyl group having 1 to 2 carbon atoms or

11. A process for preparing a treating agent which comprises reacting an amide-containing polymer having a molecular weight measured by means of an intrinsic viscosity method of 10,000 to 2,000,000, polyalkyleneimine having a degree of polymerization of not less than 20 and a halohydrin selected from the group consisting of epichlorohydrin, epibromohydrin, monochlorohydrin, monobromohydrin, dichlorohydrin and dibromohydrin in an aqueous medium at pH 6 to 10 at a temperature of 20° to 100° C., said amide-containing polymer consisting essentially of 60 to 100% by mole of a component having the following structure:

wherein $R^1$ is hydrogen or methyl group and 0 to 40% by mole of a component having the following structure:

wherein $R^2$ is hydrogen or methyl group and X is a member selected from the group consisting of —$COOR^3$, —CH, —$OCOR^6$ and —$CONHR^7$ and wherein $R^3$ is an alkyl group having 1 to 8 carbon atoms, glycidyl group or a hydroxyalkyl group having 2 to 4 carbon atoms, $R^4$, $R^5$ and $R^6$ are independently hydrogen, methyl group or ethyl group and $R^7$ is a hydroxyalkyl group having 1 to 2 carbon atoms or a molar ratio of amide group in said amide-containing polymer to amino group in said polyalkyleneimine falling within the range of 95 : 5 to 10 : 90 and a molar ratio of said halohydrin to amino group in said polyalkyleneimine falling within the range of 0.5 : 1 to 3 : 1.

12. The process of claim 11, wherein said amide-containing polymer is reacted with said polyalkyleneimine at pH 6 to 10 at a temperature of 20° to 100° C. to form a condensate and the resulting condensate is then reacted with said halohydrin at pH 4 to 10 at a temperature of 20° to 100° C.

13. A process for preparing fibrous materials which comprises forming a sheet in an aqueous medium at pH 3 to 10 in the presence of 0.05 to 10% by weight (calculated as a non-volatile material) of a treating agent according to claim 1 to fiber.

14. The process of claim 13, wherein said treating agent is the reaction product (A) according to claim 1.

15. The process of claim 13, wherein said treating agent is the reaction product (B) according to claim 1.

16. The process of claim 13, wherein said fiber is a vegetable fiber.

17. The process of claim 16, wherein said vegetable fiber is pulp.

18. The process of claim 13, wherein said fiber is a mineral fiber.

19. The process of claim 18, wherein said mineral fiber is rock wool.

* * * * *